(12) United States Patent
Nishiwaki (10) Patent No.: US 7,952,777 B2
(45) Date of Patent: May 31, 2011

(54) THREE-DIMENSIONAL VIDEO DISPLAY APPARATUS

(75) Inventor: Seiji Nishiwaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 449 days.

(21) Appl. No.: 12/298,183

(22) PCT Filed: Mar. 19, 2007

(86) PCT No.: PCT/JP2007/055472
§ 371 (c)(1),
(2), (4) Date: Oct. 23, 2008

(87) PCT Pub. No.: WO2007/122933
PCT Pub. Date: Nov. 1, 2007

(65) Prior Publication Data
US 2009/0268269 A1    Oct. 29, 2009

(30) Foreign Application Priority Data

Apr. 24, 2006  (JP) .................................. 2006-118887

(51) Int. Cl.
*G03H 1/26* (2006.01)
(52) U.S. Cl. ............................... 359/22; 348/40; 353/10
(58) Field of Classification Search .......... 359/1, 10–11, 359/22, 462–465; 348/40–41; 352/86; 353/10–11
See application file for complete search history.

(56) References Cited

U.S. PATENT DOCUMENTS
6,593,994 B2  7/2003  Son et al.
6,760,134 B1 * 7/2004  Schilling et al. ............... 359/10

FOREIGN PATENT DOCUMENTS
JP  2000-333204  11/2000
JP  2002-107667   4/2002
JP  2002-281527   9/2002

OTHER PUBLICATIONS

International Search Report issued Apr. 24, 2007 in the International (PCT) Application of which the present application is the U.S. National Stage.
"Oyo Hikari Erekutoronikusu Hando Bukku" edited by Kenichi Noda, Takanori Okoshi, Oyo erekutoronikusu hando bukku henshuu iinkai, first edition, Shokodo Co., Ltd., Apr. 10, 1989, p. 861.

* cited by examiner

*Primary Examiner* — Stephone B Allen
*Assistant Examiner* — Kimberly N. Kakalec
(74) *Attorney, Agent, or Firm* — Wenderoth, Lind & Ponack L.L.P.

(57) ABSTRACT

In a three-dimensional video display apparatus, accommodation and convergence among physiological characteristics of eyes are abandoned, thereby resulting in generation of unnatural three-dimensional video. For example, even when eyes are moved, a screen is not changed, and a cardboard effect and/or a miniature garden effect may be caused, so that the eyes may be greatly fatigued. Light emission sources 1R, 1G, and 1I, holograms 3R, 3G, and 3I, and a transparent display component 4 are provided, and a plurality of reflectors 6 are formed in the display component 4 so as to be positioned at intersections in a space lattice. Lights 2R, 2G, and 2I emitted from the light emission sources 1R, 1G, and 1I are incident on the holograms 3R, 3G, and 3I, respectively, and a plurality of diffracted converging lights 5G, 5B, and 5I are generated through the holograms 3R, 3G, and 3I, respectively, and each focused on light focusing points near the plurality of reflectors 6, and the diffracted converging lights 5G, 5B, and 5I are each reflected by the plurality of reflectors 6, and emitted to the outside through an emission surface 7s of the display component 4.

16 Claims, 6 Drawing Sheets

THREE-DIMENSIONAL VIDEO DISPLAY APPARATUS

TECHNICAL FIELD

The present invention relates to a three-dimensional video display apparatus for performing stereoscopic display for video information.

BACKGROUND ART

Figure 6:
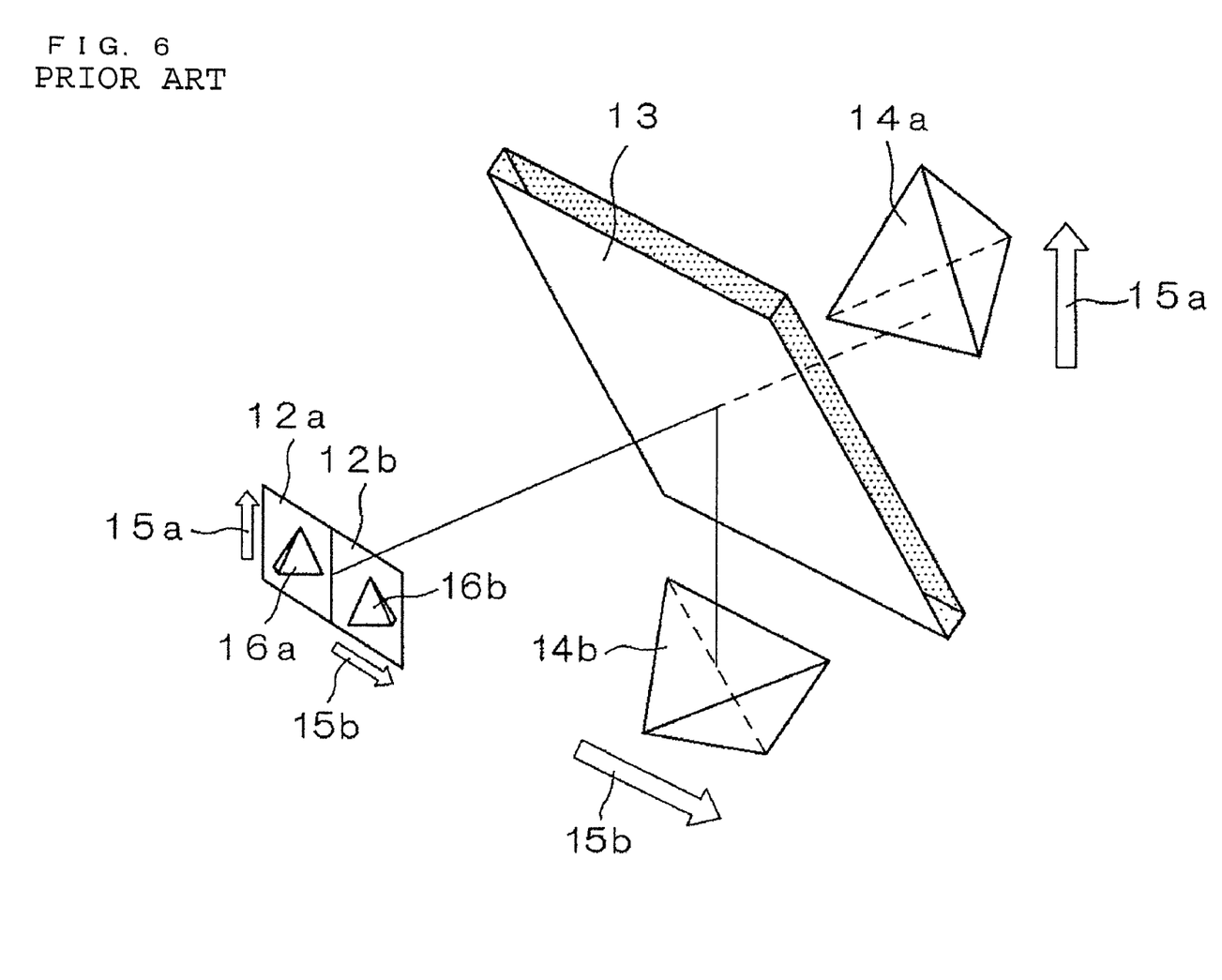
FIG. 6 is a diagram illustrating a principle and configuration of a conventional three-dimensional video display apparatus.

A conventional art is disclosed in, for example, Non-Patent Document 1. The conventional art will be described with reference to FIG. 6. FIG. 6 shows a principle and configuration of a conventional three-dimensional video display apparatus. In FIG. 6, a viewer has, on her/his left and right eyes, respectively, polarizing filters 12a and 12b which are different in polarization direction from each other, and the viewer sees a graphic 14a for a left screen and a graphic 14b for a right screen through a half mirror 13. The viewer sees an image 16a of a vertically-polarized light 15a with her/his left eye and an image 16b of a laterally-polarized light 15b with her/his right eye through the polarizing filters 12a and 12b, respectively, so that a stereoscopic effect is produced in a viewed image due to binocular parallax.

Non-Patent Document 1: "OYO HIKARI EREKUTORONI-KUSU HANDO BUKKU" edited by Kenichi Noda, Takanori Okoshi, Oyo erekutoronikusu hando bukku henshuu iinkai, first edition, SHOKODO Co., Ltd., Apr. 10, 1989, p. 861

DISCLOSURE OF THE INVENTION

Problems to be Solved by the Invention

The conventional three-dimensional video display apparatus as described above has the following problem. Specifically, a mechanism of stereoscopic viewing (formation of a three-dimensional image for eyes) may be, in general, such that learning effect is added to physiological characteristics of eyes, such as an accommodation (acquiring distance information of an object based on a degree of tension of ciliary muscles and/or muscles, around eyeball, for adjusting focus of eyes), convergence (acquiring distance information representing a distance to an object based on a degree of inward focusing of eyeballs, which occurs when both eyeballs focus on the same one point), and binocular parallax (acquiring distance information representing a distance to an object, based on a difference between images focused on retinas of right and left eyes, which is caused due to both eyes being located on positions different from each other). In the conventional three-dimensional video display apparatus, the accommodation and convergence among the physiological characteristics of eyes are abandoned, so that the three-dimensional image becomes unnatural. For example, even when eyes are moved, a screen is not changed (no motion parallax is caused), and further a cardboard effect (a displayed image looks like a flat plate), and/or a miniature garden effect may be caused, so that the eyes may be greatly fatigued.

In order to solve the problems described above, an object of the present invention is to provide a three-dimensional video display apparatus capable of displaying a natural three-dimensional video without abandoning accommodation and convergence.

Solution to the Problems

A three-dimensional video display apparatus according to the present invention comprises a light emission source, a hologram, and a transparent component, and, in the three-dimensional video display apparatus according to the present invention, a plurality of reflectors are formed in the transparent component so as to be positioned at intersections in a space lattice, a light emitted from the light emission source is incident on the hologram, a plurality of diffracted lights are generated through the hologram and focused on light focusing points near the plurality of reflectors, and the converging lights are reflected by the plurality of reflectors, and emitted to an outside through an emission surface of the transparent component.

The transparent component has at least four plane surfaces, and three plane surfaces thereamong each has the light emission source and the hologram, and a remaining one plane surface thereamong corresponds to the emission surface, and the light emission source for one of the three plane surfaces emits a red light, the light emission source for another of the three plane surfaces emits a green light, and the light emission source for the other of the three plane surfaces emits a blue light. Alternatively, the transparent component may have at least five plane surfaces, and four plane surfaces thereamong each has the light emission source and the hologram, and a remaining one plane surface thereamong corresponds to the emission surface, and the light emission source for one of the four plane surfaces emits an infrared light, the light emission source for another of the four plane surfaces emits a red light, the light emission source for a third of the four plane surfaces emits a green light, and the light emission source for the other of the four plane surfaces emits a blue light.

Further, the transparent component may have at least two plane surfaces, and one of the at least two plane surfaces has the light emission source and the hologram, and the other of the at least two plane surfaces corresponds to the emission surface, and the light emission source emits a red light, a green light, and a blue light in rotation so as to emit each of the red light, the green light, and the blue light for a predetermined unit of time, and the hologram has patterns corresponding to the red light, the green light, and the blue light, respectively, and switches among the patterns, based on an inputted electrical signal, so as to correspond to one of the red light, the green light, and the blue light, which is being emitted from the light emission source, and each of the red light, the green light, and the blue light is emitted from the light emission source for the predetermined unit of time. Moreover, the light emission source may emit an infrared light, a red light, a green light, and a blue light in rotation so as to emit each of the infrared light, the red light, the green light, and the blue light for a predetermined unit of time, and the hologram has patterns corresponding to the infrared light, the red light, the green light, and the blue light, respectively, and switches among the patterns, based on an inputted electrical signal, so as to correspond to one of the infrared light, the red light, the green light, and the blue light, which is being emitted from the light emission source, and each of the infrared light, the red light, the green light, and the blue light is emitted from the light emission source for the predetermined unit of time.

Further, a light incident on the transparent component is a linear polarized light, and a linear polarizer for blocking a component of the linear polarized light is formed on the emission surface of the transparent component, and the hologram has the patterns switched in accordance with an inputted electrical signal, and a part of the plurality of diffracted lights generated through the hologram are detected by a light detector provided on a surface of the transparent component, the surface of the transparent component facing toward the hologram, and the hologram has the patterns switched in accordance with a feedback for obtaining a constant detection output from the light detector.

Further, in a method for fabricating the three-dimensional video display apparatus according to the present invention, the transparent component is constructed such that a plurality of parallel plane plates each having micro components embedded therein at the intersections in the space lattice on a surface thereof are piled on each other with a transparent adhesive layer being sandwiched between any two of the plurality of parallel plane plates, and a focused light having a high energy is applied toward the micro components from the outside of the transparent component so as to heat the micro components and vicinities thereof, and the micro components are each shaped as a sphere due to expansion of a material of the micro components. Moreover, the micro components each includes a metal component, and the metal component is adhered to a spherical surface of each of the micro components, the spherical surface being generated due to heating, and the metal component included in each of the micro components is selected from the group consisting of Ag and Al. The transparent adhesive layer includes a thermotropic component which becomes clouded due to heating, and the transparent adhesive layer is parallel to the emission surface of the transparent component.

Effect of the Invention

As described above, the three-dimensional video display apparatus according to the present invention includes reflectors in a three-dimensional space, and therefore realizes natural display of a three-dimensional video without abandoning any of accommodation, convergence, and binocular parallax. Further, a light from the reflector positioned on a farther side can be accurately blocked, so that it is possible to realize display of a stereoscopic image including no negative image and representing an object as it actually looks.

DESCRIPTION OF THE REFERENCE CHARACTERS 1R, 1G, 1I light emission source
2R, 2G, 2I laser light
2r, 2g, 2i polarization direction
3R, 3G, 3I hologram plate
4 display component
5G, 5B, 5I diffracted converging light
6 reflector
7 linear polarizer
7s emission surface
8 reflected light
8a, 8b polarization state of reflected light

BEST MODE FOR CARRYING OUT THE INVENTION

Hereinafter, a three-dimensional video display apparatus according to an embodiment of the present invention will be described with reference to the drawings.

Embodiment 1

Figure 1:
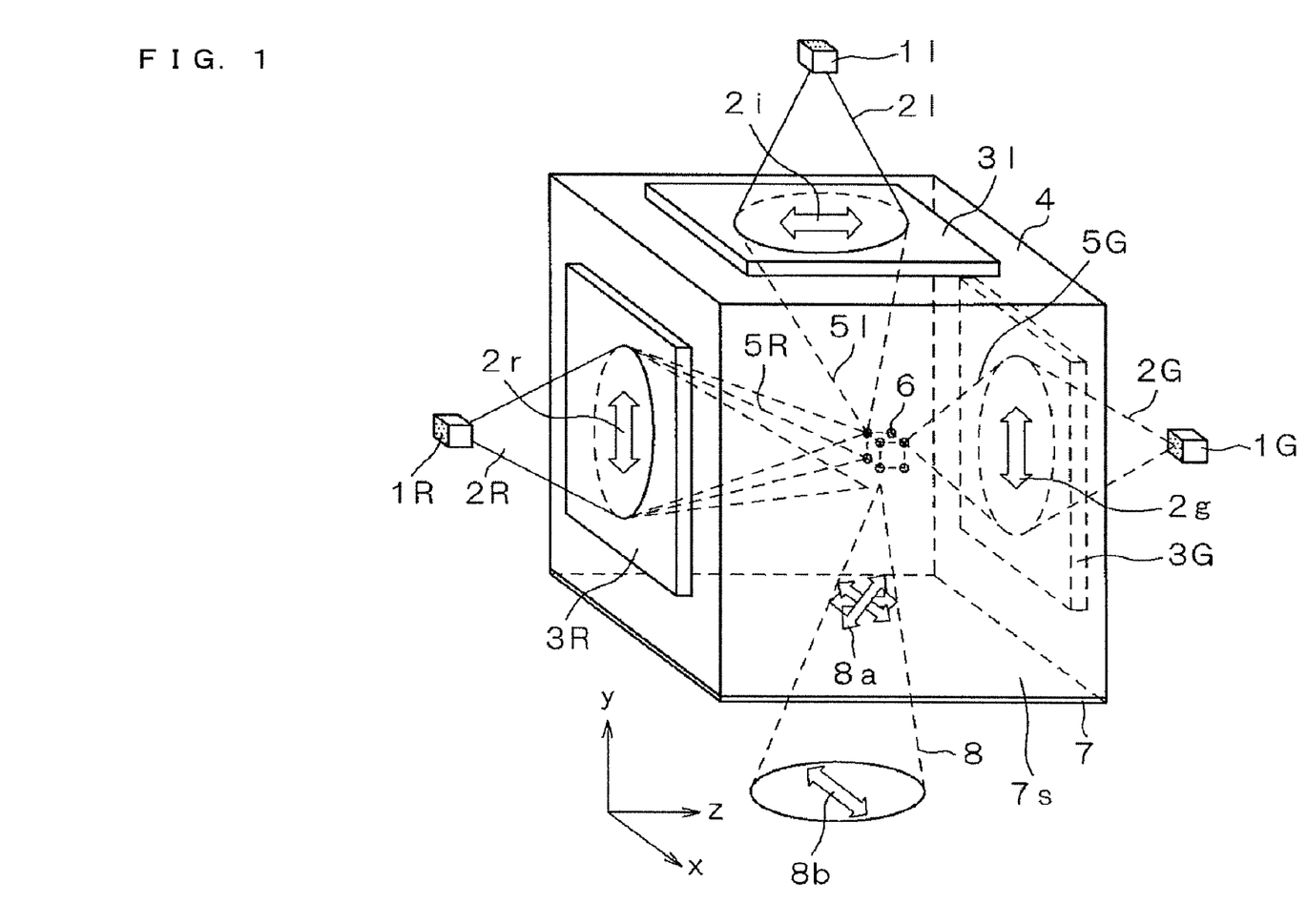
FIG. 1 is a conceptual diagram illustrating an entire configuration of a three-dimensional video display apparatus according to an embodiment of the present invention.

FIG. 1 is a conceptual diagram illustrating an entire configuration of a three-dimensional video display apparatus according to an embodiment of the present invention. In FIG. 1, a light 2R is emitted from a light emission source 1R such as a semiconductor laser along the +z axis direction so as to be in a y-axis direction polarization state 2r, and is incident on a hologram plate 3R, and is diffracted on a hologram surface so as to be separated into a plurality of converging lights, and the converging lights 5R in the polarization state 2r are incident, as they are, on a display component 4 shaped as a rectangular parallelepiped, and converge on positions different from each other in the display component. Similarly, a light 2G, a light 2B (not shown), and a light 2I are emitted from a light emission source 1G, a light emission source 1B (not shown), and a light emission source 1I, such as a semiconductor laser, along the −z axis direction, the +x axis direction, and the −y axis direction so as to be in a y-axis direction polarization state 2g, a y-axis direction polarization state 2b (not shown), and a z-axis direction polarization state 2i, and are incident on a hologram plate 3G, a hologram plate 3B (not shown), and a hologram plate 3I, respectively, and each of the light 2G, the light 2B, and the light 2I is diffracted on a hologram surface so as to be separated into a plurality of converging lights, and each of the converging lights 5G, the converging lights 5B (not shown), and the converging lights 5I are incident on the display component 4, and converge on positions different from each other in the display component.

The light emission source 1B and the hologram 3B are on the back surface of the display component 4 in FIG. 1, and if the light emission source 1B and the components associated therewith are shown in FIG. 1, FIG. 1 is complicated, and therefore these components are not shown in FIG. 1. Although in the following description the light emission source 1R and the components associated therewith are described as a representative example, the same can be said for the other light sources and the components associated therewith. When polarization performance of the light emission source is insufficient, a linear polarizer for conditioning the polarization state may be provided in front of the hologram surface, or between the hologram surface and the display component 4.

The display component 4 is made of a transparent material, and has incorporated therein reflectors 6 each having a spherical shape so as to be positioned at intersections in a space lattice. The space lattice has an x-axis direction pitch px, a y-axis direction pitch py, and a z-axis direction pitch pz, and each pitch is about 100 to 200 μm long. The diameter d of the reflector 6 is about several micrometers on average. The converging lights 5R are focused on the vicinity of the surfaces of the reflectors 6 (if possible, on a side closest to an emission surface 7s) (the size of the light focusing spot is preferably smaller than the size of the reflector 6), and the focused light is reflected, so that the reflected light is in a polarization state 8a in which random reflected lights 8 are generated, and, among them, a component transmitting in the −y axis direction is emitted to the outside through the emission surface 7s (a surface facing toward the −y axis direction) of the display component 4, so that the emitted light is viewed. The linear polarizer 7 is provided on the emission surface 7s of the display component 4 so as to emit to the outside only a light in the x axis direction polarization state 8b. Some components may not become converging lights when the diffraction through the hologram is performed, or some of the converging lights may directly reach the emission surface 7s of the display component 4 without being reflected by the reflector 6, and these lights are polarized lights orthogonal to a light in the polarization state 8b, and the linear polarizer 7 does not pass these lights therethrough, and therefore no stray light is generated.

To a viewer viewing the display component 4 from the −y axis direction from the outside, the reflector 6 in the display component looks like a luminous point. The reflector 6 is in a three-dimensional space, and therefore the reflected light 8b from the reflector 6 forms a stereoscopic image as a whole. The stereoscopic image is displayed as a natural three-dimensional video without abandoning any of the accommodation, the convergence, and the binocular parallax since the reflector 6 is actually in the three-dimensional space. When the light emission sources 1R, 1G, and 1B are a red light source, a green light source, and a blue light source, respectively, the reflector 6 acts as a luminous point emitting color lights, and a color three-dimensional video can be displayed by adjusting amounts of the lights.

The converging lights 5R pass through a plurality of the reflectors 6 to reach the convergence point. For example, an influence of the reflector 6 closest to the convergence point will be described. When NA of each converging light is 0.1, the spot diameter is 40 μm (where pz=200 μm). When the diameter d of the reflector 6 satisfies d=5 μm, lights corresponding to 100×(5/40)^2=1.6% of an area is diffused. Even the reflector provided in such a position as to exert the greatest influence exerts such a degree of influence, and the degree of the influence exerted by a reflector which is provided at a position, farther from the convergence point than the reflector closest thereto, through which the converging light passes, is exponentially reduced. The influence exerted at a distanced position (a region in which the spot diameter of the converging light is sufficiently large) through which the converging light passes will be described as follows.

In the case of the converging lights 5R, a rate ε of a component diffused per transmission over distance pz is calculated by using the following equation.

$$\epsilon = \pi/4 \times d^2/(px \times py) \quad \text{(Equation 1)}$$

The converging lights 5R are transmitted over distance a, focused on and reflected by the reflector, transmitted over distance b, and emitted from the display component 4 to the outside. In this case, a rate η of an amount of light which remains to the end is calculated by using the following equation (however, attenuations resulting from a reflectance of the reflector, diffused component, a transmittance of the linear polarizer 7, and/or the like are neglected).

$$\eta = (1-\epsilon)^{(a+b)/pz} \quad \text{(Equation 2)}$$

Therefore, the longer the transmission distance is, the larger the attenuation is. However, the transmission distance is uniformly determined based on the position of the reflector, and a hologram pattern (a pattern obtained by lights emitted from n diffraction convergence points interfering with a light emitted from a point S, in a state where the longer the transmission distance is, the greater the light intensity is) may be produced in consideration of the attenuation. When px=py=pz=200 μm and d=5 μm are satisfied, ε=0.000491 is satisfied, and when a+b=400 mm is satisfied, η=0.37 is satisfied, and light intensity ranges within up to about triple value.

Figure 2:
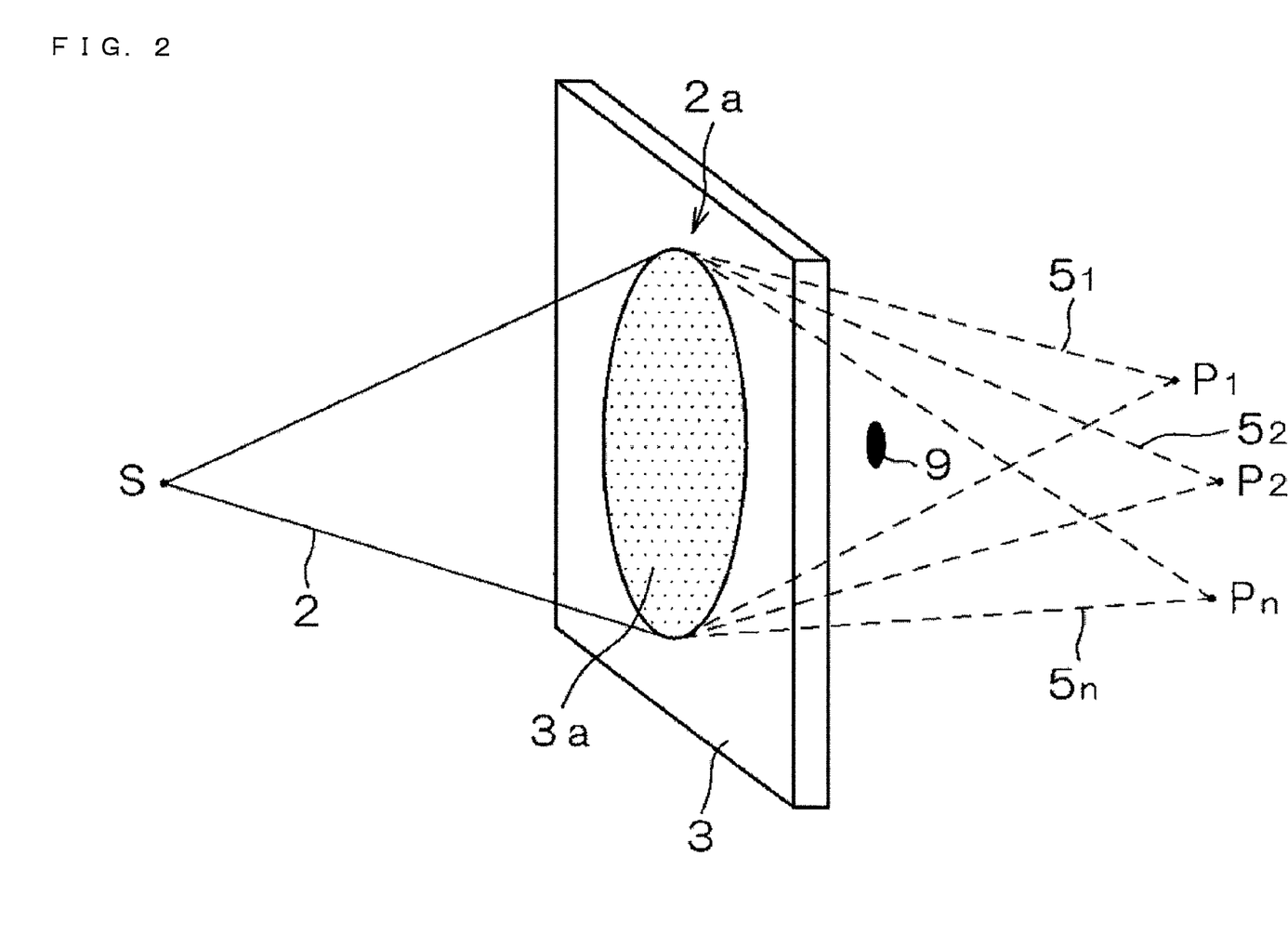
FIG. 2 is a diagram illustrating a principle of a hologram plate of the three-dimensional video display apparatus.

FIG. 2 is a diagram illustrating a principle of the hologram plate of the three-dimensional video display apparatus according to the embodiment of the present invention. When a light is transmitted through a hologram surface 3a of a hologram plate 3, a phase of the light is changed depending on a position, and the transmitted light is diffracted. In FIG. 2, for simplifying the description, the hologram plate 3 has the hologram surface 3a formed on the surface thereof. A light emitted from a point S is incident on the hologram surface 3a, and diffracted on the hologram surface 3a so as to be diffracted lights, and the diffracted lights are focused on n points (P1, P2, . . . Pn)) spatially scattered in the display component 4. The hologram surface 3a has an uneven pattern formed thereon, and the pattern (hologram pattern) causes interference between a light 2 emitted from the point S and lights emitted from the n points (P1, P2, . . . , Pn), and the pattern conforms to a pattern (interference pattern) formed by phase components of the interfering lights. If the phases of the interfering lights can be represented by using the depth of the unevenness as it is, the diffracted lights to be focused may be perfectly reproduced. However, when the phases of the interfering lights are imperfectly represented in binary (namely, 2 level gratings) or the like, the diffraction efficiency is deteriorated (namely, minus first-order diffracted lights or the like are generated in addition to components (first-order diffracted lights) to be focused). When at least a position on which lights are focused and a light intensity are determined, the interference pattern and the hologram pattern indirectly representing the interference pattern in binary or as an n-bit value can be obtained through numerical calculations. When used is a method for changing, depending on a position, the phase of the transmitted light by using an active element such as a liquid crystal, instead of the uneven surface, the hologram pattern can be changed by using a result calculated in advance, and the position on which lights are focused and the light intensity are chronologically changed, so as to perform three-dimensional display of a moving image.

The entire light incidence region 2a is an aperture for any of n converging lights (5_1, 5_2, . . . , 5_n), so that the NA (numerical aperture) is increased, the diameter of the converging light is reduced, and the focal depth is reduced. Further, aberrations caused due to the light focusing positions being various are all eliminated through the numerical calculation for obtaining the hologram pattern, so that lights can be focused on any of the light focusing points without involving aberration. Further, any region on the hologram includes phase information for all of n converging lights, and even when a part of the hologram is broken down, light amounts of the respective converging lights are uniformly reduced, that is, a complementary effect is exerted so as to cope with light shielding. For example, breakdown of the hologram does not cause loss of only the converging light 51. Further, even in a case where a light-shielding component 9 provided on the way to the light focusing point blocks a part of the converging lights, the state is the same as described above when the light-shielding component is distanced from the light focusing point, that is, the complementary effect is exerted. A method for simply focusing lights by using an objective lens and scanning the focused light may be used so as to form multiple light focusing spots. However, it is difficult to form sufficient NA, so that aberration (spherical aberration caused due to a difference in depth direction, coma aberration caused due to grazing incidence) generated depending on the light focusing positions cannot be eliminated. Thus, the formation of the converging lights by using the hologram has a lot of advantages that, for example, light focusing performance can be enhanced so as to eliminate the aberration, and the complementary effect for coping with the light shielding is exerted so as to prevent lack of the light focusing point.

Figure 3:
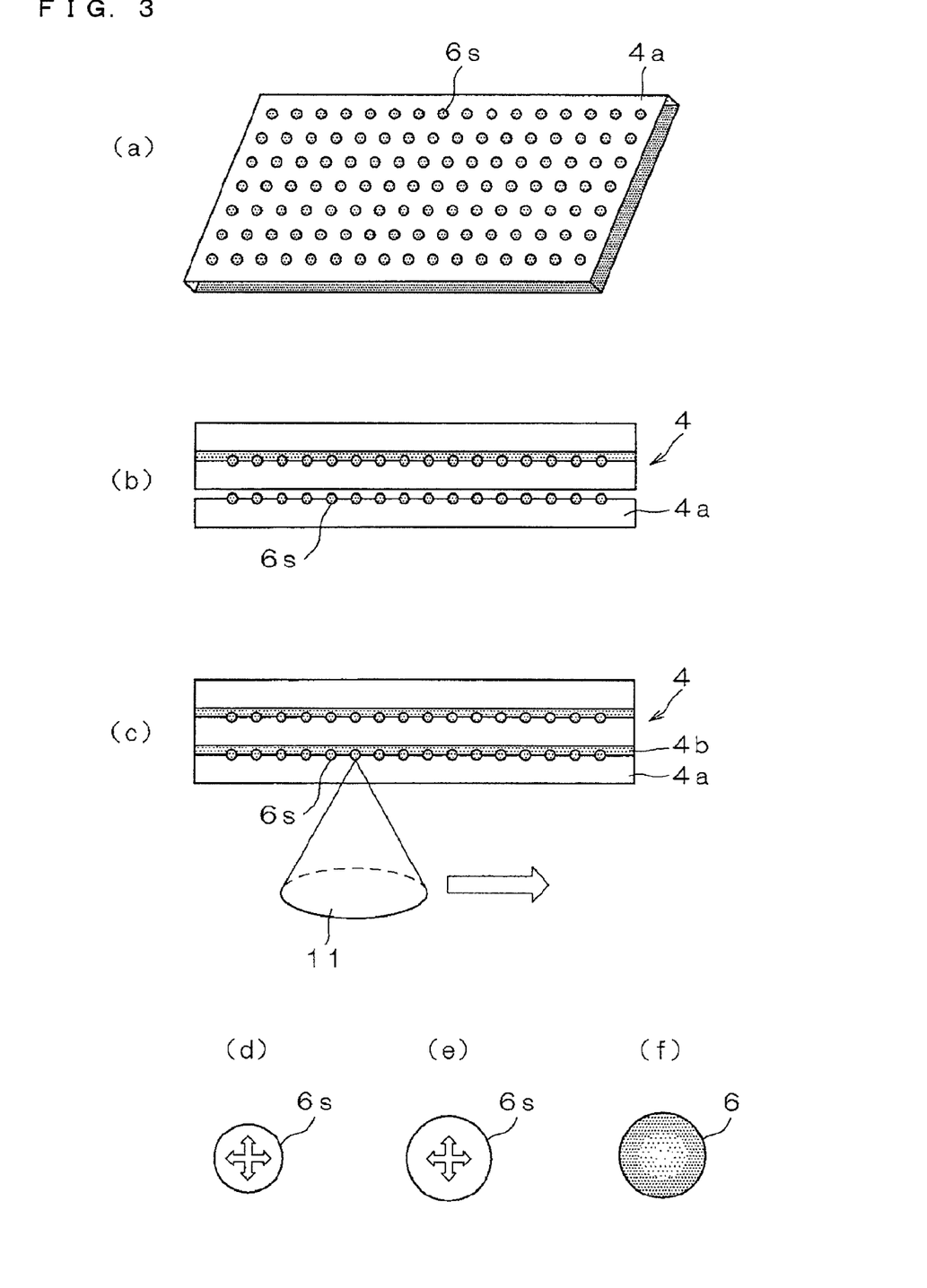
FIG. 3 is a diagram illustrating a method for fabricating a display component of the three-dimensional video display apparatus.

FIG. 3 is a diagram illustrating a method for fabricating the display component of the three-dimensional video display apparatus according to the embodiment of the present invention. As shown in FIG. 3(a), indentations are formed at the intersections in the lattice on the surface of a transparent resin substrate 4a having its thickness accurately controlled, and seeds 6s each having its weight accurately controlled are put in the indentations, respectively. The seeds 6s each includes a rubber or a plastic as a base, and also includes a metal component, such as silver (Ag) or aluminum (Al), and a compounding agent, and the seeds are dissolved due to heating, thereby generating nitrogen gas, carbon dioxide, carbon monoxide, ammonia gas, hydrogen gas, and the like. As shown in FIGS. 3(b) and 3(c), the transparent resin substrate 4a is accurately aligned with, piled on, and stuck to another transparent resin substrate 4 by sandwiching an adhesive 4b such as ultraviolet curable resin. The adhesive 4b includes heat-reactive polymer such as thermotropic polymer, and becomes clouded due to heating. However, the adhesive 4b having become clouded is restored so as to be transparent when cooled. After the sticking, a focused laser light is applied from the outside toward the seeds 6s on the transparent resin substrate 4a, and the focused laser light is moved so as to sequentially heat the seeds one by one. As shown in FIGS. 3(d), 3(e), and 3(f), the heated seeds 6s soften resin areas surrounding the seeds, is foamed, has its volume increased, has its outer contour shaped as a perfect sphere, and has attached onto its surface a metal component vaporized due to heating, thereby forming the reflector 6 having a spherical surface. The transparent resin substrate 4a is sequentially piled on another one by repeating the aforementioned process step, thereby fabricating the display component 4 according to the embodiment of the present invention. The adhesive layer 4b is parallel to a surface perpendicular to the y-axis in FIG. 1. The seed 6s may be simply foaming agent or a metal particle having a low melting point, and the reflector 6 is formed as spherical foam in the case of a foaming agent, and the reflector 6 is formed as a metal sphere in the case of a metal particle.

Figure 4:
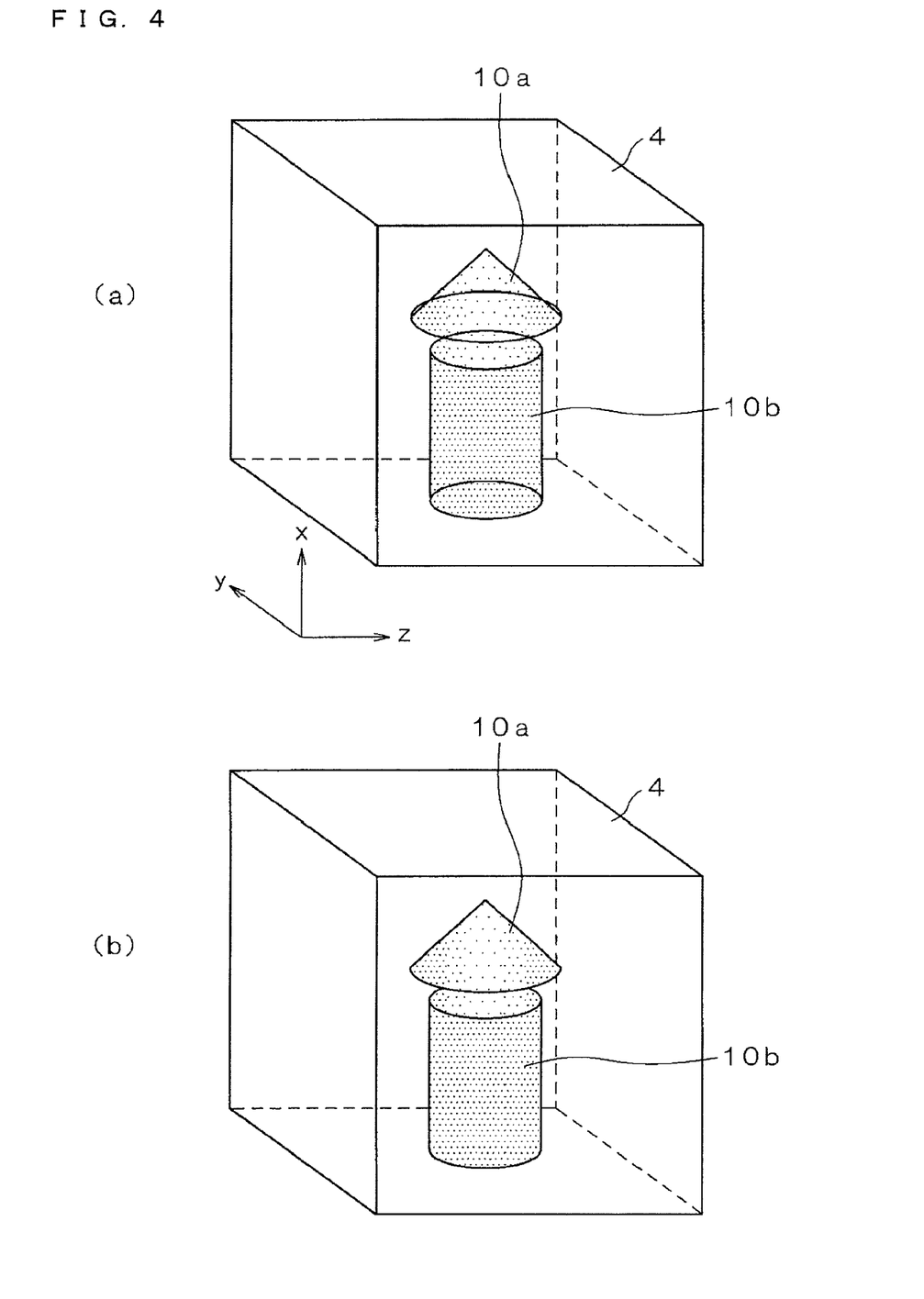
FIG. 4 is a diagram illustrating a three-dimensional image displayed by the three-dimensional video display apparatus.

FIG. 4 is a diagram illustrating a three-dimensional image displayed by the three-dimensional video display apparatus according to the embodiment of the present invention. In FIG. 1, the light emission source 1I is an infrared light source, and when a viewer in the outside views the display component 4 from the −y axis direction in a state where a light from this light source is extinguished, stereoscopic images 10a and 10b are viewed as shown in FIG. 4(a). The stereoscopic image looks transparent like a ghost, and an outline can be viewed although, in an actual stereoscopic image, the outline is invisible due to a light being blocked. This is because although in the case of the actual stereoscopic image a reflector blocks (eliminates a negative image) a light which comes from another reflector positioned on a farther side than the reflector, a light blocking function is substantially reduced in the case of the stereoscopic image according to the embodiment.

Next, a light is emitted from the light emission source 1I, and a plurality of diffracted lights are focused on the adhesive layer 4b provided at a predetermined position. At this time, the adhesive layer 4b positioned at the light focusing position is heated, and the thermotropic component included in the adhesive layer 4b becomes clouded, thereby functioning to block a light. Therefore, when a light from the light emission source 1I is focused on the vicinity (a region on a further side as viewed from a viewer) of the surfaces of the stereoscopic images 10a and 10b, only a light from a reflector which is positioned on the farther side can be accurately blocked without influencing a light from a reflector which is positioned on a nearer side, thereby realizing a stereoscopic image representing an object as it actually looks, as shown in FIG. 4(b). The thermal reaction of the thermotropic component is reversible, and the thermotropic component is restored so as to be transparent when an application of a light is stopped and the thermotropic component is cooled, and therefore the elimination of a negative image in a stereoscopic moving image can be also realized in realtime. The adhesive layer 4b including the thermotropic component is positioned so as to be perpendicular to the direction of the light 5I from the light emission source 1I, and the adhesive layer 4b easily receives the light and is effectively clouded. Further, the adhesive layer 4b is positioned so as to be also perpendicular to the direction of the reflected light 8, which is convenient for eliminating a negative image. On the other hand, the adhesive layer 4b is positioned so as to be parallel to the direction of each of the lights (5R, 5G, 5B) from the light emission sources 1R, 1G, and 1B, respectively, and therefore the lights cannot be easily received, and an adverse effect (for example, the clouded region blocks the converging light) on generation of the stereoscopic image is minimized.

Figure 5:
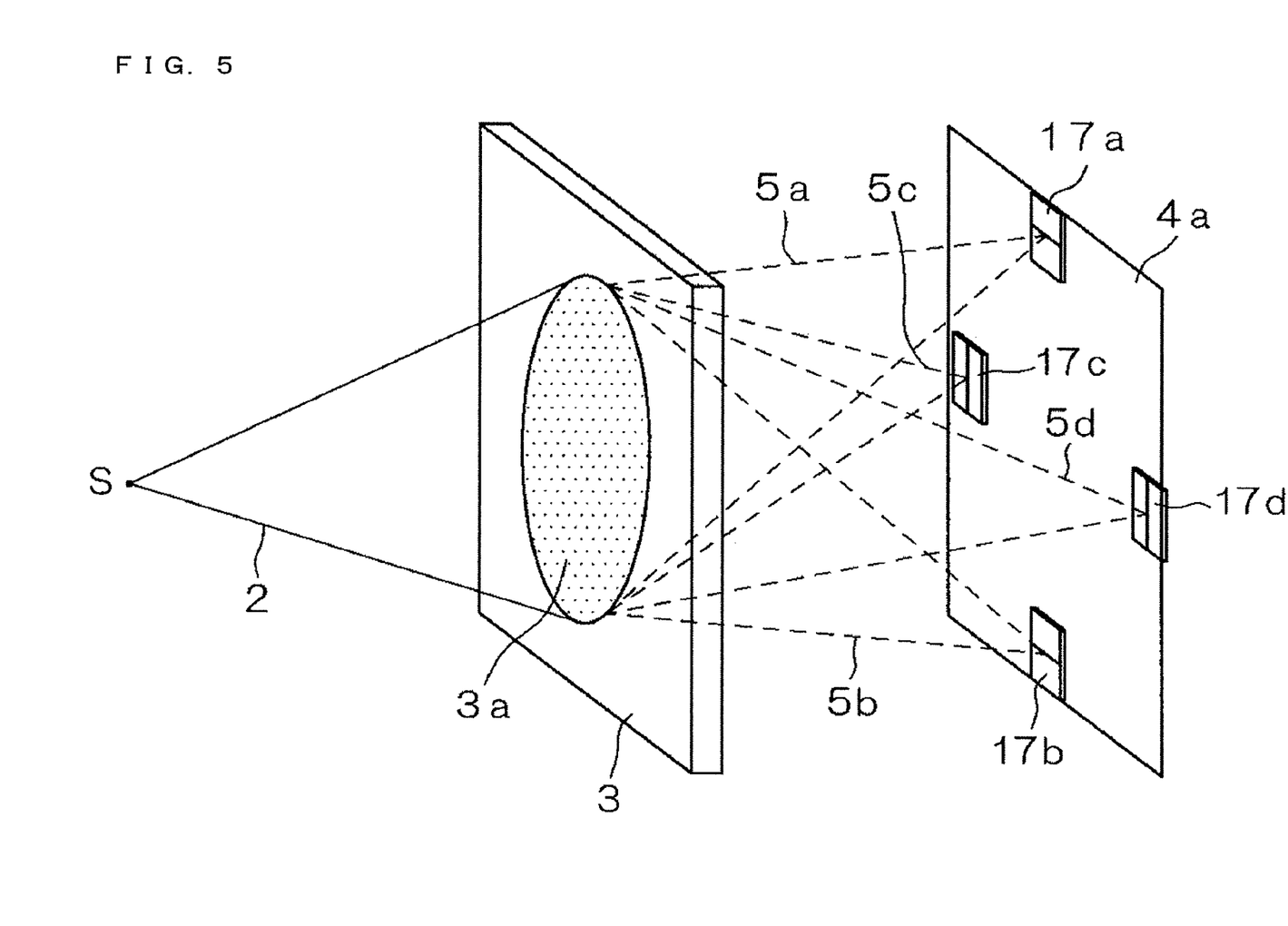
FIG. 5 is a diagram illustrating a method for adjusting the three-dimensional video display apparatus.

FIG. 5 is a diagram illustrating a method for adjusting the three-dimensional video display apparatus according to the embodiment of the present invention. In the embodiment of the present invention, it is necessary to accurately apply a plurality of converging lights to the reflectors 6 in the display component, and when the light source S and/or the hologram plate 3 are not accurately positioned, a displayed image is blurred. Therefore, a two-part split light detector is positioned near a surface 4a, in the display component, facing toward the hologram 3 so as to adjust, while monitoring a difference signal from the detector, positions of the light source S and the hologram plate 3. At this time, a hologram pattern for generating diffracted lights 5a, 5b, 5c, and 5d each of which is to be focused on a reference position of the facing surface 4a is used, and a vertical position is determined based on the outputs from the detectors 17a and 17b, and a lateral position is determined based on the outputs from the detectors 17c and 17d. The position on which the diffracted lights are focused is changed in accordance with a wavelength of a light from the light source being changed. Accordingly, while the stereoscopic image is being displayed as well as while the adjustment is being made, the hologram generates, at any time, the diffracted lights 5a, 5b, 5c, and 5d to be focused on the reference position of the facing surface 4a, and the difference signals from the detectors are monitored, so as to provide feedback for correcting a hologram pattern, thereby preventing deterioration of the displayed image.

In the embodiment described above, as shown in FIG. 1, the three light emission sources 1R, 1G, and 1B are used as the light emission source. The light emission sources 1R, 1G, and 1B are a red light source, a green light source, and a blue light source, respectively. The present invention is not limited thereto. One light source may collectively act as a red, a green, and a blue light sources. When the three light emission sources are used as described above, three lights are separately emitted from the three light emission sources, respectively, and may be focused on positions, respectively, which are slightly different from each other in practice although it is preferable that the three lights are focused on exactly the same position. The difference of the light focusing position may adversely affect generation of a stereoscopic image, for example, an originally intended color may not be displayed. Therefore, one light source is used so as to prevent the positions on which lights, respectively, are focused from being different from each other. Specifically, when the number of light emission points is one, the position on which the lights are focused is fixed. In this case, one light emission source, for example, 1R of FIG. 1 may emit a red, a green, and a blue lights. The light emission source 1R may act as a light source to emit each of a red light, a green light, and a blue light for a predetermined time period in order, respectively. Specifically, emitting, for example, a red light, a green light, and a blue light from the light emission source 1R in order, respectively, may be repeated. On the other hand, the hologram pattern of the hologram surface 3a on which a light is incident from the light source 1R is provided so as to previously include patterns corresponding to the red, the green, and the blue lights, respectively. Alternatively, when an active element such as a liquid crystal is used as the hologram surface 3a, the hologram patterns corresponding to the red, the green, and the blue lights, respectively, are obtained by numerical calculation. At a time at which the light source changes from any one of the red, the green, and the blue light sources to another one, the hologram pattern may be changed to the corresponding hologram pattern. Thus, when the number of the light emission sources is one, it is possible to prevent positions on which lights, respectively, are focused from being different from each other, as compared to a case where a plurality of light sources separately emit a red, a green, and a blue lights, respectively, as described above, thereby obtaining a stereoscopic image with enhanced clearness.

Further, an infrared light as described above may be emitted from the same one light emission source as described above. That is, one light emission source emits each of a red, a green, a blue, and an infrared lights for a predetermined time period in rotation. At a time at which the emitted light is changed, the hologram pattern may be changed to a corresponding one of the patterns for the red, the green, the blue, and the infrared lights. Thus, positions on which lights, respectively, are focused is prevented from being different from each other as described above, and adverse effect on the generation of the stereoscopic image can be further reduced, and the elimination of a negative image as described above may be also realized.

INDUSTRIAL APPLICABILITY

The three-dimensional video display apparatus according to the present invention has a reflector in a three-dimensional space, and is capable of realizing natural display of a three-dimensional video without abandoning any of accommodation, convergence, and binocular parallax, accurately blocking a light from a reflector positioned on the farther side, and realizing display of a stereoscopic image which includes no negative image and represents an object as it completely actually looks, and therefore is applicable as various apparatuses or devices for displaying a three-dimensional video.

The invention claimed is:

1. A three-dimensional video display apparatus comprising a light emission source, a hologram, and a transparent component,
wherein a plurality of reflectors are formed in the transparent component so as to be positioned at intersections in a space lattice, a light emitted from the light emission source is incident on the hologram, a plurality of diffracted lights are generated through the hologram and focused on light focusing points near the plurality of reflectors, and the converging lights are reflected by the plurality of reflectors, and emitted to an outside through an emission surface of the transparent component.

2. The three-dimensional video display apparatus according to claim 1, wherein the transparent component has at least four plane surfaces, and three plane surfaces thereamong each has the light emission source and the hologram, and a remaining one plane surface thereamong corresponds to the emission surface, and the light emission source for one of the three plane surfaces emits a red light, the light emission source for another of the three plane surfaces emits a green light, and the light emission source for the other of the three plane surfaces emits a blue light.

3. The three-dimensional video display apparatus according to claim 1, wherein the transparent component has at least five plane surfaces, and four plane surfaces thereamong each has the light emission source and the hologram, and a remaining one plane surface thereamong corresponds to the emission surface, and the light emission source for one of the four plane surfaces emits an infrared light, the light emission source for another of the four plane surfaces emits a red light, the light emission source for a third of the four plane surfaces emits a green light, and the light emission source for the other of the four plane surfaces emits a blue light.

4. The three-dimensional video display apparatus according to claim 1,
wherein the transparent component has at least two plane surfaces, and one of the at least two plane surfaces has the light emission source and the hologram, and the other of the at least two plane surfaces corresponds to the emission surface,
wherein the light emission source emits a red light, a green light, and a blue light in rotation so as to emit each of the red light, the green light, and the blue light for a predetermined unit of time, and
wherein the hologram has patterns corresponding to the red light, the green light, and the blue light, respectively, and switches among the patterns so as to correspond to one of the red light, the green light, and the blue light, which is being emitted from the light emission source, and each of the red light, the green light, and the blue light is emitted from the light emission source for the predetermined unit of time.

5. The three-dimensional video display apparatus according to claim 1,
wherein the transparent component has at least two plane surfaces, and one of the at least two plane surfaces has the light emission source and the hologram, and the other of the at least two plane surfaces corresponds to the emission surface,
wherein the light emission source emits an infrared light, a red light, a green light, and a blue light in rotation so as to emit each of the infrared light, the red light, the green light, and the blue light for a predetermined unit of time, and
wherein the hologram has patterns corresponding to the infrared light, the red light, the green light, and the blue light, respectively, and switches among the patterns so as to correspond to one of the infrared light, the red light, the green light, and the blue light, which is being emitted from the light emission source, and each of the infrared light, the red light, the green light, and the blue light is emitted from the light emission source for the predetermined unit of time.

6. The three-dimensional video display apparatus according to claim 5, wherein the transparent adhesive layer includes a thermotropic component which becomes clouded due to heating.

7. The three-dimensional video display apparatus according to claim 6, wherein the transparent adhesive layer is parallel to the emission surface of the transparent component.

8. The three-dimensional video display apparatus according to claim 1, wherein a light incident on the transparent component is a linear polarized light, and a linear polarizer for blocking a component of the linear polarized light is formed on the emission surface of the transparent component.

9. The three-dimensional video display apparatus according to claim 1, wherein the hologram has the patterns switched in accordance with an inputted electrical signal.

10. The three-dimensional video display apparatus according to claim 9, wherein a part of the plurality of diffracted lights generated through the hologram are detected by a light detector provided on a surface of the transparent component, the surface of the transparent component facing toward the hologram, and the hologram has the patterns switched in accordance with a feedback for obtaining a constant detection output from the light detector.

11. The three-dimensional video display apparatus according to claim 1, wherein the transparent component is constructed such that a plurality of parallel plane plates each having micro components embedded therein at the intersections in the space lattice on a surface thereof are piled on each other with a transparent adhesive layer being sandwiched between any two of the plurality of parallel plane plates.

12. The three-dimensional video display apparatus according to claim 11, wherein a focused light having a high energy is applied toward the micro components from the outside of the transparent component so as to heat the micro components and vicinities thereof, and the micro components are each shaped as a sphere due to expansion of a material of the micro components.

13. The three-dimensional video display apparatus according to claim 12, wherein the metal component included in each of the micro components is selected from the group consisting of Ag and Al.

14. The three-dimensional video display apparatus according to claim 11, wherein the micro components each includes a metal component, and the metal component is adhered to a spherical surface of each of the micro components, the spherical surface being generated due to heating.

15. The three-dimensional video display apparatus according to claim 14, wherein the metal component included in each of the micro components is selected from the group consisting of Ag and Al.

16. The three-dimensional video display apparatus according to claim 11, wherein the transparent adhesive layer is parallel to the emission surface of the transparent component.

* * * * *